Patented Aug. 21, 1945

2,383,016

UNITED STATES PATENT OFFICE 2,383,016

SEPARATION PROCESS

George Riethof, Mount Lebanon, Pa., assignor to Pittsburgh Coke & Iron Company, Pittsburgh, Pa., a corporation of Pennsylvania No Drawing. Application May 12, 1944,
Serial No. 535,397

7 Claims. (Cl. 202—42)

This invention relates to a separation process; and more particularly it relates to the separation of 3-picoline, 4-picoline, and 2,6-lutidine from one another.

One of the principal sources of these three compounds, 3-picoline, 4-picoline, and 2,6-lutidine is the basic coal tar oils in which they commonly occur associated with one another. These basic coal tar oils may be practically fractionated to produce certain cuts composed predominantly of a mixture of 3-picoline, 4-picoline and 2,6-lutidine. Hence, these materials are generally commercially obtained as a basic oil mixture boiling about 140–145° C. Since these compounds boil so closely together, it is not commercially feasible to fractionate such basic oil mixtures into their separate components.

I have now found, contrary to expectations, that such bases may be separated from each other and recovered by azeotropic distillation utilizing a maximum boiling azeotrope in a process which is simple and in which the amount of recovery of the components and their purity is commercially satisfactory.

It is a principal object of this invention to provide a process for the separation of 3-picoline, 4-picoline and 2,6-lutidine from one another and from basic coal tar oils comprised predominantly of these compounds.

It is a further object to provide a process for resolving 3-picoline, 4-picoline and 2,6-lutidine containing oils into their separate components which can be easily operated with close control so as to yield commercially pure products.

It is a still further object to provide a new separation process which employs the use of maximum boiling azeotropic mixtures.

Additional objects and the entire applicability of the present process will become more apparent from the description of the invention given hereinafter.

These objects are accomplished according to the process of my invention by admixing the indicated basic oils with a suitable quantity of phenol and distilling from this mass the maximum boiling azeotropes of the basic components of the oil with phenol and separately collecting the various fractions.

The process of this invention is more fully illustrated in the following example, in which all parts are by weight unless otherwise specified:

Example I

A commercial mixture of 500 parts of a basic coal tar oil containing approximately 30% 2,6-lutidine, 35% 3-picoline and 35% 4-picoline is charged into the still pot of a rather high efficiency fractionating column. To this basic oil is added 1200 parts of commercial phenol, a ratio of phenol to basic oil of about 2.4 to 1. The phenol/basic oil mixture is then subjected to fractional distillation through the column. A forerun of approximately 1% of the total mixture is collected, after which the maximum boiling azeotropes of 2,6-lutidine, 3-picoline, and 4-picoline are collected in that order and at a temperature in the range of 186–191° C.

In order to obtain 3-picoline of high purity the middle or 3-picoline/phenol azeotrope is again fractionated through a similar column and a middle fraction of 80% is collected. This middle fraction is then treated with an excess of sodium hydroxide solution and the 3-picoline is distilled off.

The 2,6-lutidine and the 4-picoline fractions are treated in a similar fashion in order to obtain the substantially pure compounds.

The recovery of the basic oils may be accomplished in other ways. For instance, by sulfuric acid treatment of the azeotrope and distilling off the phenol.

The temperature range given above may vary somewhat depending upon the barometric pressure. In the example, the pressure was approximately 750 millimeters.

Example II

In this example 1500 parts of phenol and 500 parts commercial basic oils are employed, a ratio of phenol to basic oil of about 3 to 1. The process is otherwise as described in Example I, with the exception of a forerun of about 320 parts consisting substantially of phenol.

The ratio of phenol to basic oils, as illustrated in the above examples, may be varied from the examples, where at least 2.4 parts by weight of phenol for each part by weight of basic oil are employed. For efficient operation of the process, it has been found preferable to employ an amount of phenol to form an azeotrope with all basic oil present.

The composition of the basic oil being treated may be varied. However, this process is principally applicable to those basic oils which are composed predominately of 3-picoline, 4-picoline and 2,6-lutidine. The ratio by weight of these latter materials may be varied relative to one another.

I claim:

1. The process of separating a mixture predominantly containing at least two of the bases 3-picoline, 4-picoline, and 2,6-lutidine which comprises including in the mixture phenol, and fractionally distilling the mass.

2. The process of claim 1 wherein the distillates are phenol azeotropes of said bases.

3. The process of claim 1, wherein the mass distilled comprises at least about 2.4 parts by weight of phenol for each part by weight of the basic oil.

4. The process of claim 1 wherein the distillate fractions boiling in the range between substantially 186–191° C. are separately collected.

5. The process of claim 1 wherein the distillate fractions boiling in the range between substantially 186–191° C. are separately collected and redistilled.

6. The process of claim 1 wherein the distillate fractions boiling in the range between substantially 186–191° C. are separately collected and redistilled and wherein the redistilled fractions are treated to recover the substantially pure base contained therein.

7. The process of separating a mixture containing at least two of the bases 3-picoline, 4-picoline, and 2,6-lutidine which comprises including in the mixture phenol, fractionally distilling the mass, and thereafter recovering from the fractions the substantially pure base contained therein.

GEORGE RIETHOF.